United States Patent [19]

Vinci et al.

[11] Patent Number: 5,182,126

[45] Date of Patent: Jan. 26, 1993

[54] RUMINANT FEED SUPPLEMENT

[75] Inventors: Alfredo Vinci, Dayton; Kenneth R. Cummings, Skillman, both of N.J.

[73] Assignee: Church & Dwight Co., Inc., Princeton, N.J.

[21] Appl. No.: 853,967

[22] Filed: Mar. 20, 1992

[51] Int. Cl.$^5$ ............................................. A23K 1/00
[52] U.S. Cl. ...................................... 426/74; 426/601; 426/623; 426/630; 426/658; 426/807; 426/648
[58] Field of Search ................. 426/623, 630, 648, 74, 426/72, 656, 608, 601, 807, 658, 96, 97, 69

[56] References Cited

U.S. PATENT DOCUMENTS 4,826,694  5/1989  McAskie ............................ 426/541

OTHER PUBLICATIONS

Aiello et al. "Fatty acid effects on gluconeogenesis in goat calf and guinea pig hepatocytes" Comparative Biochemistry and Physiology, B (Comparative Biochemistry vol. 91 (1988) pp. 339-344 Cited as Dialog Abstract 0811798 from File 50.

*Primary Examiner*—R. B. Penland
*Attorney, Agent, or Firm*—Charles B. Barris

[57] ABSTRACT

In one embodiment this invention provides a process for preparing a feed supplement product which contains $C_{14}$–$C_{22}$ fatty acid alkaline earth metal salt and a propionate glucogenous ingredient as essential constituents.

The feed product can function as a rumen bypass composition, and permit the beneficial increase of the nutrient fat content of the ruminant feed ration, and facilitate metabolic glucose formation by gluconeogenesis during the digestive cycle.

17 Claims, No Drawings

RUMINANT FEED SUPPLEMENT

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is a concentrated energy source, and it is known that if the proportion of fat in cattle feed is increased, lactating dairy cattle produce high milk yields without draining their reserves of body fat and without diminishing the proportion of milk fat in the milk produced.

However, it has been found that if the proportion of fat in the diet of cattle exceeds about 5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, the total energy derived is less than that resulting from more complete microbial digestion in the rumen.

There has been a continuing need for new dietary supplements for animal feed which can be fed to ruminant animals without interfering with the rumen microorganisms, or being rendered ineffective by the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen inert product which passes through the rumen without interfering with rumen fermentation (i.e., a rumen bypass product), and is subsequently metabolized in the abomasum or small intestine of the ruminant.

Another important aspect of lactating dairy cattle feed relates to periods of negative energy balance in which animal body mass is metabolized to compensate for the energy deficiency. If a consequential metabolic ketosis disorder occurs in the lactating animals, a reduced yield of milk occurs.

Glucose is an important nutrient and energy source for lactating ruminants. Bloodglucose is the main precursor for lactose. A lactating cow that produces 30 kg of milk per day utilizes more than 2 kg of glucose daily.

If glucose is administered to lactating ruminants in feedstuff, it is converted to lower fatty acids in the rumen, and little or no glucose is available for absorption in the lower digestive tract. The glucose deficit in lactating ruminants is satisfied mainly by gluconeogenesis, i.e., by the metabolic formation of glucose from glucogenous compounds such as propionate. The availability of glucogenous compounds in highly lactating ruminants is an important feed nutrition factor.

Accordingly, it is an object of the invention to provide a fatty acid salt composition which can function as a rumen bypass animal feed supplement, and permit a beneficial increase in the dietary fat content of the feed.

It is another object of this invention to provide a process for preparing a fatty acid salt ruminant feed supplement having a content of propionate glucogenous ingredient which has rumen bypass protection.

Other objects and advantages of the present invention shall become apparent from the accompanying description and examples.

DESCRIPTION OF THE INVENTION

One or more objects of the present invention are accomplished by the provision of a process for the preparation of a fatty acid salt feed supplement product which comprises (1) forming an admixture of reactive ingredients comprising (a) at least one $C_{14}$-$C_{22}$ fatty acid, (b) between about 0.8-1.5 equivalents of basic alkaline earth metal compound per equivalent of $C_{14}$-$C_{22}$ fatty acid, (c) between about 10-80 weight percent of an aqueous medium, based on the weight of fatty acid, and (d) a propionate glucogenous ingredient; and (2) recovering the salt product after completion of the exothermic salt-forming reaction.

In another embodiment this invention provides a feed supplement which comprises (a) at least one $C_{14}$-$C_{22}$ fatty acid salt of an alkaline earth metal; (b) $C_{14}$-$C_{22}$ fatty acid glyceride; and (c) propionate glucogenous ingredient.

In another embodiment this invention provides a feed supplement product in friable solid form which comprises (a) at least one $C_{14}$-$C_{22}$ fatty acid calcium salt; (b) between about 1-15 weight percent of $C_{14}$-$C_{22}$ fatty acid glyceride, based on the weight of $C_{14}$-$C_{22}$ fatty acid calcium salt; and (c) between about 0.5-20 weight percent of 1,2-propylene glycol, based on the weight of $C_{14}$-$C_{22}$ fatty acid calcium salt.

The term "glyceride" as employed herein includes $C_{14}$-$C_{22}$ fatty acid monoglycerides, diglycerides and triglycerides, and any mixture thereof.

The $C_{14}$-$C_{22}$ fatty acid component of the salt-forming reaction medium of the invention process consists of one or more saturated or unsaturated carboxylic acids such as those derived from beef and mutton tallow, lard, cottonseed oil, palm oil, and the like.

Palm fatty acid distillate is a commercial product produced by distilling the fatty acids present in natural palm oil. A distillate product typically has the following weight percent content:

| | |
|---|---|
| Free fatty acids | 60–90 |
| Water | <1 |
| Triglycerides | 10–40 |
| Unsaponifiables | <3 |

The iodine value is less than 54 and the melting point is about 45° C. The content of peroxides is below 10 milliequivalents of oxygen per kilogram. The fatty acids in the free fatty acids and the triglycerides consist of the following weight percent:

| | |
|---|---|
| Palmitic acid | 38–50 |
| Oleic acid | 35–40 |
| Linoleic acid | 5–10 |
| Stearic acid | 3–6 |
| Lauric acid | 1–3 |

Beef tallow acids are available commercially as a byproduct obtained by alkaline extraction of waste beef fat and subsequent acidification, and normally contain the following weight percent of fatty constituents:

| | |
|---|---|
| Free fatty acids | 60–90 |
| Triglycerides | 10–40 |
| Water | <1 |
| Unsaponifiables | <3 |

The iodine value is less than 50 and the melting point is 40°–45° C. The content of peroxides is less than 10 milliequivalents of oxygen per kilogram. The fatty acids in the free fatty acids and in the triglycerides have the following weight percent content:

| | |
|---|---|
| Palmitic acid | 22–28 |
| Oleic acid | 38–44 |
| Linoleic acid | 3–6 |
| Stearic acid | 18–24 |

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03–0.1% or higher of antioxidant as permitted by regulation, and about 0.05–0.3% of chelating agent, based on the weight of fatty acid.

Illustrative of preferred additives are butylated hydroxytoluene antioxidant, and citric acid and ethylenediamine tetraacetate chelating agents. The chelating agent is added in an edible solvent such as propylene glycol to facilitate blending into the fatty acid.

The alkaline earth metal compound ingredient of the invention salt-forming process is at least one member selected from the group consisting of basic calcium and magnesium compounds, such as oxides, carbonates, carboxylates, halides, hydroxides, nitrates, and the like. The metal compound ingredient is present in a quantity between about 0.8–1.5 equivalents, based on the equivalent weight of fatty acid ingredient.

The propionate glucogenous ingredient in the invention salt forming process is utilized in a quantity between about 0.5–20 weight percent, based on the weight of $C_{14}$–$C_{22}$ fatty acid ingredient.

Illustrative of glucogenous organic structures are edible propionate type compounds which include 1-propanol; 2-propanol; propanal; 2-hydroxypropanal; 3-hydroxypropanal; 2-ketopropanal; propionic acid and corresponding alkali metal and alkaline earth metal salts; $C_1$–$C_{22}$ aliphatic propionates; propyl esters of $C_2$–$C_{22}$ carboxylic acids; propyl monohydric and polyhydric alcohols; aminoacids such as alanine; and the like. Alkali metal bicarbonates also have been demonstrated to function as a glucose precursor for synthesis of lactose in lactating animals.

In a further embodiment this invention provides a product of the invention process which is a feed supplement composition in friable solid form which comprises (a) at least one $C_{14}$–$C_{22}$ fatty acid salt of an alkaline earth metal; (b) $C_{14}$–$C_{22}$ fatty acid glyceride; (c) propionate glucogenous ingredient; and (d) additional biologically active ingredient.

The biologically active ingredient of an invention feed supplement composition can be selected from a broad variety of nutrients and medicaments, either as a single component or as a mixture of components, which are illustrated by the following listing of active molecular species:

1. $C_2$–$C_{22}$ aliphatic carboxylic acids and esters, and alkali metal, ammonium and alkaline earth metal salts which are different than the selected $C_{14}$–$C_{22}$ fatty acid ingredient of the process.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| Protein | 12.0% |
| Fat | 0.7% |
| Lactose | 60.0% |
| Phosphorus | 0.79% |
| Calcium | 0.87% |
| Ash | 9.7% |

Another source of carbohydrate is derived from the pulp and paper industry which produces large quantities of byproduct lignin sulfonates from wood during the sulfite pulping process. The byproduct is recovered in the form of salts such as ammonium, sodium and magnesium lignin sulfonates.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs thereof.

4. vitamin ingredients either singly or in combination which include thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper manganese, iron, zinc, tin, nickel, chromium, molybdenum, iodine, chlorine, silicon, vanadium, selenium, calcium, magnesium, sodium and potassium.

5. protein ingredients as obtained from sources such as dried blood or meat meal, cottonseed meal, soy meal, dehydrated alfalfa, dried and sterilized animal and poultry manure, fish meal, liquid or powdered egg, fish solubles, cell cream, rape seed oil (canola oil), and the like.

Protein equivalent ingredients include non-protein nitrogen compounds such as urea, biuret, ammonium phosphate, and the like.

6. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

7. enzymes such as lipolytic proteins which aid feed digestibility, e.g., by hydrolysis of fatty acid glycerides to free fatty acid and glycerol.

The biologically active ingredient quantity employed in the process for feed supplement composition production typically will vary in the range between about 0.05–20 weight percent, based on the weight of $C_{14}$–$C_{22}$ fatty acid ingredient.

Other optional ingredients such as antioxidants, preservatives and surfactants can be incorporated in the invention proces for production of feed supplement products.

Antioxidants are illustrated by butylated hydroxyanisole, butylated hydroxytoluene, tertiarybutylhydroquinone, propyl gallate, and ethoxyquin; and suitable preservatives include sodium sorbate, potassium sorbate, sodium benzoate, propionic acid, α-hydroxybutyric acid, and the like.

Suitable suspension stabilizing agents preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

The invention process can be conducted in a batch reactor or as a continuous operation. The fatty acid, alkaline earth metal compound, glucogenous ingredient and aqueous medium can be admixed simultaneously, or the fatty acid and alkaline earth metal compound can be blended first and then combined with the other processing components.

In one processing method the fatty acid is heated to 80°–110° C. or higher, and then mixed with the alkaline earth metal compound. After the aqueous medium and glucogenous ingredient are added to the mixture, there is a short induction period which is followed by exothermic alkaline earth metal compound hydrating and fatty acid salt-forming reactions.

The amount of aqueous medium employed is sufficient to support the metal compound hydrating and fatty acid salt-forming reactions, and preferably is vaporized as steam during the exothermic reaction period to yield a friable fatty acid salt product which in granule form is suitable for use as an animal feed supplement.

The glucogenous compound can be added as a separate stream, or it can be premixed with the fatty acid ingredient and/or the aqueous medium.

If an additional biologically active ingredient is included in the processing formulation, it can be premixed with the $C_{14}$–$C_{22}$ fatty acid, or with the aqueous medium, as determined by the fat-solubility or water-solubility of the biologically active ingredient.

A present invention fatty acid salt product is adapted to function as a rumen bypass dietary supplement in ruminant feed. An important advantage of a present invention feed supplement composition is the rumen bypass protection which extends to all the biologically active ingredients of the composition, which normally are metabolized in the rumen.

A particularly preferred fatty acid salt feed supplement product of the present invention is one which contains ,1,2-propylene glycol as the glucogenous ingredient. The incorporation of 1,2-propylene glycol in a feed supplement provides several important advantages. 1,2-Propylene glycol exhibits fungicidal and antioxidant properties, and serves as a palatability enhancer in animal feed. 1,2-Propylene glycol also can inhibit the symptoms of ketosis in cattle.

Under the reaction conditions of the present invention process, 1,2-propylene glycol can form ketals and acetals with malodorous ketones and aldehydes and suppress the undesirable volatility of these compounds. 1,2-Propylene glycol also can function as a plasticizer, and improve the quantity and particle size distribution of the feed supplement product of the invention process.

The following Examples are further illustrative of the present invention. The components and specific ingredients are presented as being typical, and various modifications can be derived in view of the foregoing disclosure within the scope of the invention.

EXAMPLE I

This Example illustrates the continuous production of fatty acid calcium salt feed supplement product in accordance with the present invention.

The fatty acid component is a palm fatty acid distillate of the following composition:

| | |
|---|---|
| Lauric acid | 2.3% |
| Palmitic acid | 49.9% |
| Stearic acid | 5.4% |
| Oleic acid | 35.0% |
| Linoleic acid | 7.4% |

A residual effluent aqueous medium is obtained from a Church & Dwight Co., Inc. sodium bicarbonate manufacturing plant in Old Fort, Ohio. The aqueous medium contains about 4.2% sodium carbonate-bicarbonate. A calculated quantity of 1,2-propylene glycol is added to the aqueous medium.

The process is operated continuously with equipment which is essentially the same as described and illustrated with reference to FIG. 1 of U.S. Pat No. 4,826,694 by W. McAskie.

Calcium oxide from a hopper and hot palm oil distillate (96° C.) from a supply line are mixed in predetermined proportions in a mixing pump. The residual effluent aqueous medium containing dissolved 1,2-propylene glycol is added to the reactant blend by a supply line.

The hydrated mixture is passed through a mixing pump and the resultant semi-liquid reaction medium at about 100° C. is discharged as a spread layer onto a continuously moving conveyor belt. Steam evolves from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt product is passed through a sifter, and collected in bags suitable for transportation and storage.

The residence time on the first conveyor is about 30 minutes, and the overall production time from reactant mixing to collection of the dry granulated product is about 2.25 hours.

The final product has a total fatty acid calcium salt content of 85 weight percent, a water content of about 3–5 weight percent, a 1,2-propylene glycol content of about 6 weight percent, and an ash content of about 15 weight percent.

The invention fatty acid calcium salt product can be incorporated as a dietary supplement in cattle feed such as hay silage or corn silage, in a calculated quantity which will provide each animal about 500 grams per day of fatty acid salt, and 35 grams of 1,2-propylene glycol.

The continuous process is repeated, except that calcium propionate is admixed with the calcium oxide, as an additional glucogenous ingredient.

EXAMPLE II

This Example illustrates the preparation of an invention fatty acid calcium salt feed supplement product containing an aminoacid.

A liquid nutrient formulation is prepared from the following ingredients:

|  | Parts |
|---|---|
| Potassium oleate | 350 |
| Potassium stearate | 350 |
| Palmitic acid | 100 |
| Methionine hydroxy analog | 200 |

The ingredients are added in the listed order to 1000 parts of water with high speed stirring.

The viscosity of the resultant emulsion is measured on a Brookfield viscometer with a number 6 spindle at 12 rpm. The emulsion has a viscosity of about 300 centipoises, and a pH of 8.

Another emulsion is prepared in the described manner except that two parts of guar gum are added to the water before the other ingredients. The measured viscosity of the emulsion is about 800 centipoises.

Another emulsion is prepared except that 20 parts of sucrose are dissolved in the water before the other ingredients are added. The viscosity of the emulsion is about 900 centipoises.

Each of the three liquid formulations, respectively, is added to the aqueous medium described in Example I, and a granular feed supplement product is produced in accordance with the continuous process of Example I.

What is claimed is:

1. A process for the preparation of a fatty acid salt feed supplement product which comprises (1) forming an admixture of reactive ingredients consisting essentially of (a) at least one $C_{14}$-$C_{22}$ fatty acid, (b) between about 0.8-1.5 equivalents of basic alkaline earth metal compound per equivalent of $C_{14}$-$C_{22}$ fatty acid, (c) between about 10-80 weight percent of an aqueous medium, based on the weight of fatty acid, and (d) between about 0.5-20 weight percent of a propionate glucogenous ingredient in an amount effective to increase the metabolic glucose content of the feed supplement, based on the weight of $C_{14}$-$C_{22}$ fatty acid ingredient; and (2) recovering the salt product after completion of the exothermic salt-forming reaction.

2. A process in accordance with claim 1 wherein the fatty acid ingredient is a mixture comprising 0-10 percent lauric acid, 0-60 percent palmitic acid, 0-10 percent stearic acid, 0-60 percent oleic acid, and 0-10 percent linoleic acid.

3. A process in accordance with claim 1 wherein the alkaline earth metal ingredient is a basic calcium compound or magnesium compound or a mixture thereof.

4. A process in accordance with claim 1 wherein the propionate glucogenous ingredient is propyl ester.

5. a process in accordance with claim 1 wherein the propionate gluocgeneous ingredient is propionic acid, propionate ester or propionate salt.

6. A process in accordance with claim 1 wherein the propionate gluocgenous ingredient is propyl monohydric or polyhydric alcohol.

7. A process in accordance with claim 1 wherein the propionate glucogenous ingredient is 1,2-propylene glycol.

8. A process in accordance with claim 1 wherein the propionate glucogenous ingredient is alanine.

9. A process in accordance with claim 1 wherein the $C_{14}$-$C_{22}$ fatty acid and alkaline earth metal compound are premixed before admixture with the other process ingredients.

10. A process in accordance with claim 1 wherein the propionate glucogenous ingredient and aqueous solution are premixed before admixture with the other process ingredients.

11. A process in accordance with claim 1 wherein the propionate glucogenous ingredient and $C_{14}$-$C_{22}$ fatty acid are premixed before admixture with the other process ingredients.

12. A process in accordance with claim 1 wherein the exothermix salt-forming reaction medium is at a temperature between about 60°-110° C.

13. A process in accordance with claim 1 wherein water evaporation occurs during the salt-forming reaction, and the salt product is recovered in the form of friable granules.

14. A feed supplement product in friable solid form which consists essentially of (a) at least one $C_{14}$-$C_{22}$ fatty acid calcium salt; (b) between about 1-15 weight percent of $C_{14}$-$C_{22}$ fatty acid glyceride, based on the weight of $C_{14}$-$C_{22}$ fatty acid calcium salt; and (c) between about 0.5-20 weight percent of 1,2-propylene glycol in an amount effective to increase the metabolic glucose content of the feed supplement, based on the weight of $C_{14}$-$C_{22}$ fatty acid calcium salt.

15. A feed supplement product in friable solid form which consists essentially of (a) at least one $C_{14}$-$C_{22}$ fatty acid salt of an alkaline earth metal; (b) between about 1-15 weight percent of $C_{14}$-$C_{22}$ fatty acid glyceride, based on the weight of $C_{14}$-$C_{22}$ fatty acid salt ingredient; and (c) between about 0.5-20 weight percent of a propionate glucogenous ingredient in an amount effective to increase the metabolic glucose content of the feed supplement, based on the weight of $C_{14}$-$C_{22}$ fatty acid salt ingredient.

16. A feed supplement product in friable solid form which consists essentially of (a) at least one $C_{14}$-$C_{22}$ fatty acid salt of an alkaline earth metal; (b) between about 1-15 weight percent of $C_{14}$-$C_{22}$ fatty acid glyceride, based on the weight of $C_{14}$-$C_{22}$ fatty acid salt ingredient; and (c) between about 0.5-20 weight percent of bicarbonate glucogenous ingredient in an amount effective to increase the metabolic glucose content of the feed supplement, based on the weight of $C_{14}$-$C_{22}$ fatty acid salt ingredient.

17. A feed supplement product in friable solid form which consists essentially of (a) at least one $C_{14}$-$C_{22}$ fatty acid salt of an alkaline earth metal; (b) between about 1-15 weight percent of $C_{14}$-$C_{22}$ fatty acid glyceride, based on the weight of $C_{14}$-$C_{22}$ fatty acid salt ingredient; (c) between about 0.5-20 weight percent of a glucogenous ingredient in an amount effective to increase the metabolic glucose content of the feed supplement, based on the weight of $C_{14}$-$C_{22}$ fatty acid salt ingredient; and (d) between about 0.05-20 weight percent of an additional biologically active ingredient, based on the weight of fatty acid salt ingredient.

* * * * *